(12) United States Patent
Matalon et al.

(10) Patent No.: US 11,788,640 B2
(45) Date of Patent: Oct. 17, 2023

(54) KEYING STRUCTURE

(71) Applicant: ITT MANUFACTURING ENTERPRISES LLC, Wilmington, DE (US)

(72) Inventors: Louis E. Matalon, Lancaster, PA (US); Richard Kovacs, Lancaster, PA (US); Michael D. Yoder, Quarryville, PA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 17/431,875

(22) PCT Filed: Feb. 20, 2019

(86) PCT No.: PCT/US2019/018736
§ 371 (c)(1),
(2) Date: Aug. 18, 2021

(87) PCT Pub. No.: WO2020/171807
PCT Pub. Date: Aug. 27, 2020

(65) Prior Publication Data
US 2022/0128162 A1    Apr. 28, 2022

(51) Int. Cl.
*F16K 27/02*    (2006.01)
*F16K 7/12*    (2006.01)

(52) U.S. Cl.
CPC .......... *F16K 27/0236* (2013.01); *F16K 7/126* (2013.01)

(58) Field of Classification Search
CPC . F16K 7/12; F16K 7/123; F16K 7/126; F16K 7/14; F16K 7/16; F16K 7/17; F16K 7/20; F16K 27/0236; Y10T 137/0491; Y10T 137/0497
See application file for complete search history.

(56) References Cited

U.S. PATENT DOCUMENTS 9,016,307 B2 *   4/2015  Matalon .................. F16K 7/126
                                                      251/248
2015/0354718 A1  12/2015  Schwetz et al.

FOREIGN PATENT DOCUMENTS

DE    29506874 U1 *  8/1995   ............ F16K 7/126
EP    2875266 A1     5/2015
EP    3333465 A1     6/2018

OTHER PUBLICATIONS

Machine English translation of DE-29506874-U1 (Year: 2022).*
(Continued)

*Primary Examiner* — Hailey K. Do
(74) *Attorney, Agent, or Firm* — CARTER, DELUCA & FARRELL LLP; George Likourezos; Bret P. Shapiro

(57) ABSTRACT

Technologies are described for a bonnet assembly of a diaphragm valve. The bonnet assembly may comprise a handwheel. The bonnet assembly may comprise a housing. The housing may include a housing base. The housing base may include a top, a bottom, and four sides. Body stud heads of body studs of a body assembly may be in contact with an edge of the top of the housing base. The bonnet assembly may be configured to secure to the body assembly with the body stud heads at least partially exposed.

11 Claims, 6 Drawing Sheets

(56) References Cited

OTHER PUBLICATIONS

International Search Report dated Aug. 2, 2019 for corresponding International PCT Application No. PCT/US2019/018736.
Written Opinion issued in corresponding Singapore Patent Application No. 11202108694V dated Mar. 31, 2023.
Office action in corresponding Chinese Patent Application No. 201980092603.X dated Jun. 26, 2023.

* cited by examiner

KEYING STRUCTURE

This application claims priority to PCT/US2019/018736, filed Feb. 20, 2019 and is related to application serial number PCT/US2019/18734 entitled Diaphragm Assembly, and application serial number PCT/US2019/018739 entitled Transition Pressure Ring.

BACKGROUND

Unless otherwise indicated herein, the materials described in this section are not prior art to the claims in this application and are not admitted to be prior art by inclusion in this section.

Diaphragm valves may be comprised of three major subassemblies, the bonnet assembly, the body assembly, and the diaphragm assembly. The bonnet assembly and the body assembly may be held together with a series of bolts around the periphery of the assemblies. The diaphragm assembly may be positioned in between the bonnet assembly and the body assembly. The bonnet assembly and the body assembly may be separated to inspect and/or replace the diaphragm assembly.

SUMMARY

One embodiment of the invention is a bonnet assembly of a diaphragm valve. The bonnet assembly may comprise a handwheel. The bonnet assembly may comprise a housing. The housing may include a housing base. The housing base may include a top, a bottom, and four sides. Body stud heads of body studs of a body assembly may be in contact with an edge of the top of the housing base. The bonnet assembly may be configured to secure to the body assembly with the body stud heads at least partially exposed.

Another embodiment of the invention includes a connect system for a diaphragm valve. The system may comprise a bonnet assembly. The bonnet assembly may include a handwheel and a housing. The housing may include a housing base. The housing base may include a top, a bottom, and four sides. The system may comprise a body assembly. The body assembly may include body studs. The body studs may each include a body stud head. The body stud heads may be in contact with an edge of the top of the housing base. The bonnet assembly may be secured to the body assembly with the body stud heads at least partially exposed.

Another embodiment of the invention is a method to secure a bonnet assembly to a body assembly. The method may comprise contacting body stud heads of body studs of a body assembly with an edge of a top of a housing base of a bonnet assembly. The bonnet assembly may include a handwheel. The method may comprise rotating the handwheel of the bonnet assembly. The rotation of the handwheel may apply a force from the bonnet assembly to the body assembly to secure the body stud heads to the edge of the top of the housing base. The rotation of the handwheel may secure the bonnet assembly to the body assembly with the body stud heads at least partially exposed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
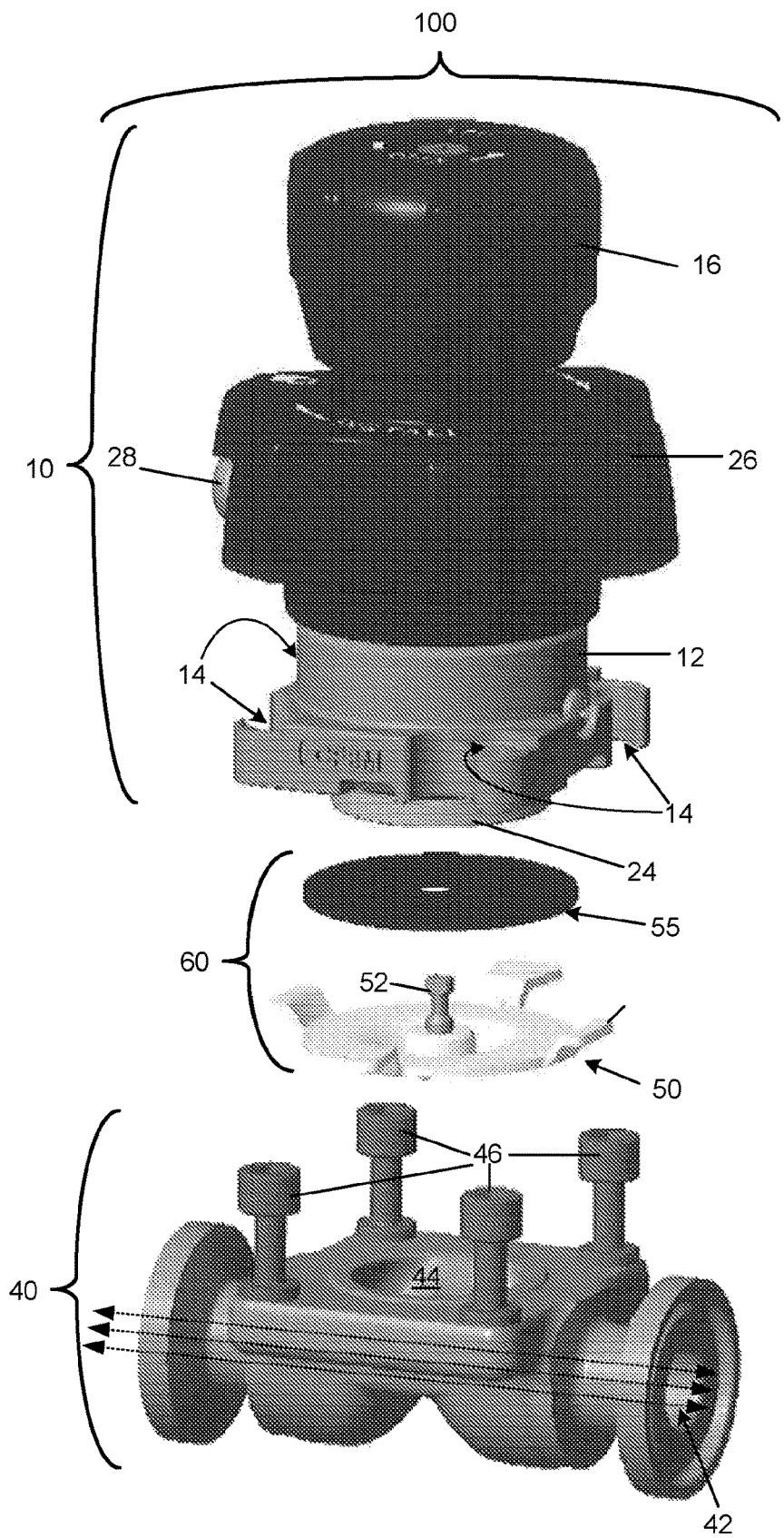
FIG. 1 is a side perspective view illustrating a diaphragm valve including a bonnet assembly, a diaphragm assembly, and a body assembly before assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated. and designed in a wide variety of different configurations, all of which are explicitly contemplated herein.

FIG. 1 is a side perspective view illustrating a diaphragm valve including a bonnet assembly, a diaphragm assembly. and a body assembly before assembly, arranged in accordance with at least some embodiments described herein. Diaphragm valve 100 may include a bonnet assembly 10, a diaphragm assembly 60, and a body assembly 40. Bonnet assembly 10 may include a housing 12, a handwheel 16, pressure ring 24, a safety lock handwheel 26, and a safety lock 28. Housing 12 may further define keyholes 14.

Diaphragm assembly 60 may include a diaphragm 50 and a backing cushion 55. Diaphragm 50 may include a diaphragm stud 52. Diaphragm stud 52 may be embedded in a central boss of diaphragm 50 and may be configured to couple with an open aperture of bonnet assembly 10. Diaphragm stud 52 may be a threaded stud, an unthreaded cylindrical stud with a cross pin or a metal stud. Backing cushion 55 may have a disc shape and material of backing cushion 55 may define a small aperture through the middle of backing cushion 55. Diaphragm stud 52 may insert through the small aperture defined by backing cushion 55 and into open aperture of bonnet assembly 10. Backing cushion 55 may be sandwiched between diaphragm 50 and pressure ring 24 of bonnet housing 12 when diaphragm is attached to bonnet assembly 10.

Body assembly 40 may define a fluid passageway 42. Body assembly 40 may include a weir 44. Weir 44 may be positioned within fluid passageway 42 and may cooperate with diaphragm assembly 60 to control a flow of fluid through fluid passageway 42. Body assembly 40 may include body studs 46. Body assembly 40 may include four body studs 46 on a first side of body assembly 40. One body stud 46 may be affixed at each of four top corners of body assembly 40. Body studs 46 may be configured in a square or rectangular pattern on top side of body assembly 40 when viewed from above. Body studs 46 may have an angle of 0 degrees between the sides of the square or rectangular pattern of body studs 46 and the sides of body assembly 10. Body studs 46 may be configured in an offset square or rectangular pattern on top side of body assembly 40 when viewed from above. Body studs 46 may have an angle of non-zero degrees between the sides of the square or rectangular pattern of body studs 46 and the sides of body assembly 10. Body studs 46 may align with keyholes 14 defined by housing 12 of bonnet assembly 10. As described in more detail below, keyholes 14 and bonnet assembly 10 may be positioned around body studs 46 and rotated around a primary axis of diaphragm valve 100 to attach bonnet assembly 10 to body 40.

Figure 2:
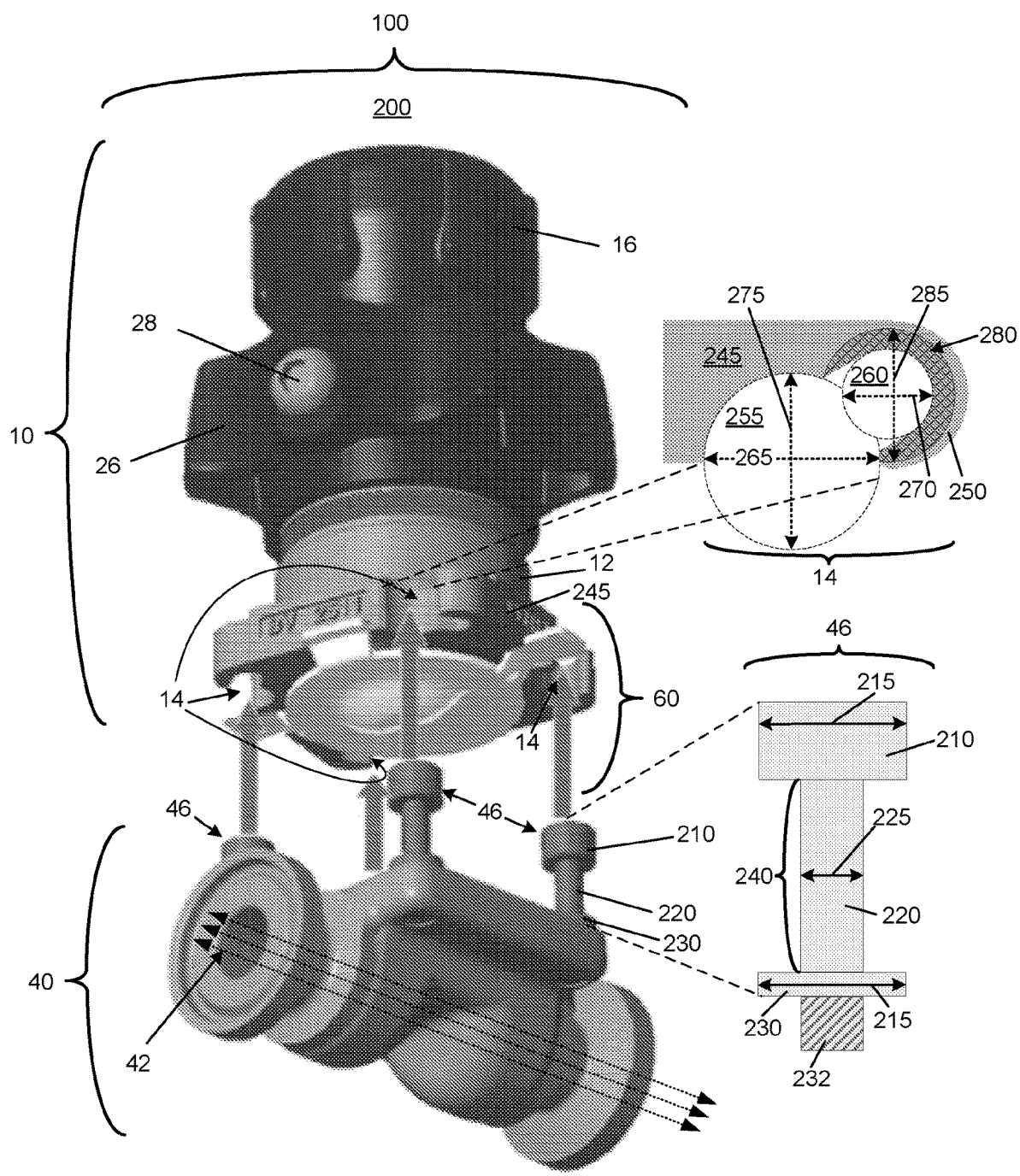
FIG. 2 is a bottom perspective view illustrating alignment of a body assembly to a bonnet assembly of a diaphragm valve.

FIG. 2 is a bottom prospective view illustrating alignment of a body assembly to a bonnet assembly of a diaphragm valve, arranged in accordance with at least some embodiments presented herein. Those components in FIG. 2 that are labeled identically to components of FIG. 1 will not be described again for the purposes of brevity. System 200 may include bonnet assembly 10, diaphragm assembly 60, and body assembly 40.

Body studs 46 may comprise hardened stainless steel to prevent galling. Each body stud 46 may include a body stud head 210, a body stud neck 220, a body stud base 230, and a body stud fastener 232. Body stud head 210 may be cylindrical with a diameter 215. Body stud neck may be cylindrical with a diameter 225 and a height 240. Body stud base 230 may be cylindrical with a diameter of 215. Body stud fastener 232 may have male threads and may thread into body assembly 40 to attach body stud 46 to body assembly 40 or may thread through body assembly 40 to a nut opposite body assembly 40 to attach body stud to body assembly 40. A first circular end of body stud head 210 may be attached to a first circular end of body stud neck 220. A second circular end of body stud neck 220 may be attached to a first circular end of body stud base 230. A second circular end of body stud base 230 may be attached to body 40. Diameter 215 may be larger than diameter 225 and body stud head 210 may extend out axially from body stud 46 and body stud neck 220.

Housing 12 may comprise stainless steel. Housing 12 may include a housing base 245. Housing base 245 may include a top, a bottom and four sides. Housing base 245 may include key hooks 250. Housing base 245 and key hooks 250 may comprise stainless steel. A key hook 250 may project along the surface of each of the four sides of housing base 245. Each key hook 250 may curve towards an adjacent side of housing base 245. Walls of key hooks 250 and walls of housing base 245 may define keyholes 14. Walls of housing base 245 may define a slot 255 for each keyhole 14. Walls of key hooks 250 may define a slot 260 for each key hole 14. Walls of housing base 245 and walls of key hook 250 may define an opening 265 for each keyhole 14. Slot 255 may be defined by housing base 245 as a portion of a cylindrical opening through housing base 245 with a diameter 275. Slot 260 may be defined by key hook 250 as a cylindrical opening through key hook 250 with a diameter 270 that is in communication with slot 255. Slot 255 and slot 260 may overlap. Diameter 270 may be larger than diameter 225 of body stud neck 220 and body stud neck 220 may fit within slot 255. Diameter 275 may be larger than diameter 215 of body stud head 210 and body stud head 210 may fit within slot 255. Diameter 270 may be smaller than diameter 215 of body stud head 210 and body stud head 210 may not fit within slot 260. Opening 265 may be defined by walls of housing base 245 and walls of key hook 250 to allow body stud neck 220 to enter into slot 255 and or slot 260. Walls of housing base 245 and walls of key hooks 250 may further define stud head wells 280. Stud head wells 280 may have an essentially circular outline and may be defined by walls of each key hook 250 and walls of housing base 245 as a cylindrical indentation in a top side of each key hook 250 and adjacent side of housing base 245. Stud head wells 280 may each have a diameter of 285. Diameter 285 may be larger than diameter 215 of body stud head 210 such that body heads 210 may fit within stud head wells 280. As shown in FIG. 2, body studs 46 and keyholes 14 may be aligned for placement of bonnet assembly 10 on body assembly 40.

Figure 3:
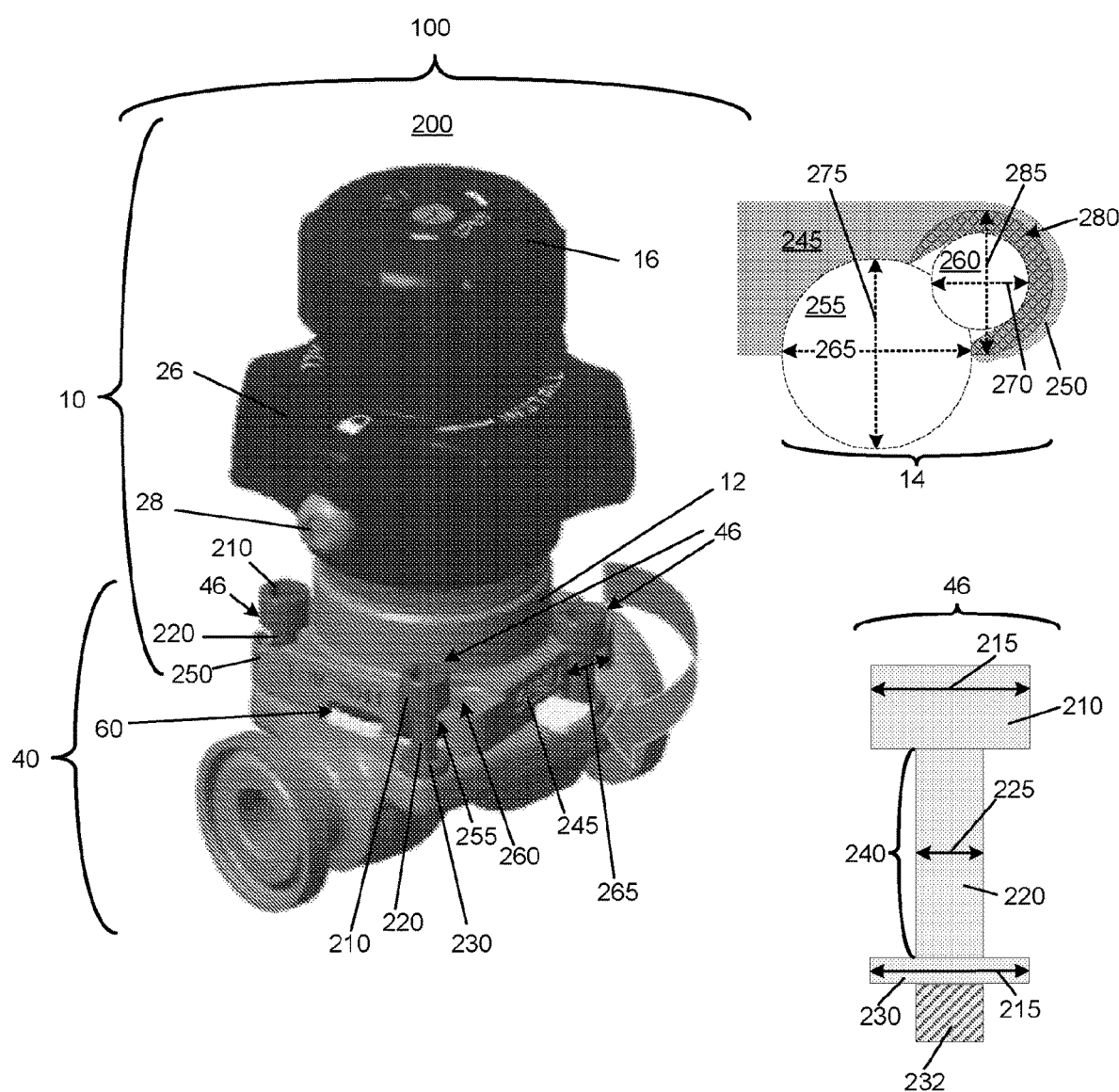
FIG. 3 is a top perspective view illustrating attaching a bonnet assembly to a body assembly of a diaphragm valve.

FIG. 3 is a top prospective view illustrating attaching a bonnet assembly to a body assembly of a diaphragm valve, arranged in accordance with at least some embodiments presented herein. Those components in FIG. 3 that are labeled identically to components of FIGS. 1-2 will not be described again for the purposes of brevity.

Body studs 46 of body assembly 40 may be in alignment with keyholes 14 defined by walls of housing base 245 and walls of key hooks 250. Bonnet assembly 10 may be in contacted with body assembly 40 such that body studs 46 vertically pass through openings 265 and/or slots 255 defined by walls of housing base 245 and walls of key hooks 250. Body stud heads 210 may pass through openings 265 and/or slots 255. Body stud necks 220 may engage with slots 255. Diaphragm assembly 60 may be in contact with body assembly 40. Body stud heads 210 may be above slots 255 and may not engage with slots 255. Bonnet assembly 12 may rotate and bonnet assembly 12 may be rotated such that body stud necks 220 are within slots 260 and in contact with key hooks 250. Key hooks 250 may be in contact with and essentially around body stud necks 220. After rotation of bonnet assembly 12, body stud heads 210 may be within and in contact with stud head wells 280 defined by key hooks 250 and housing base 245.

Figure 4:
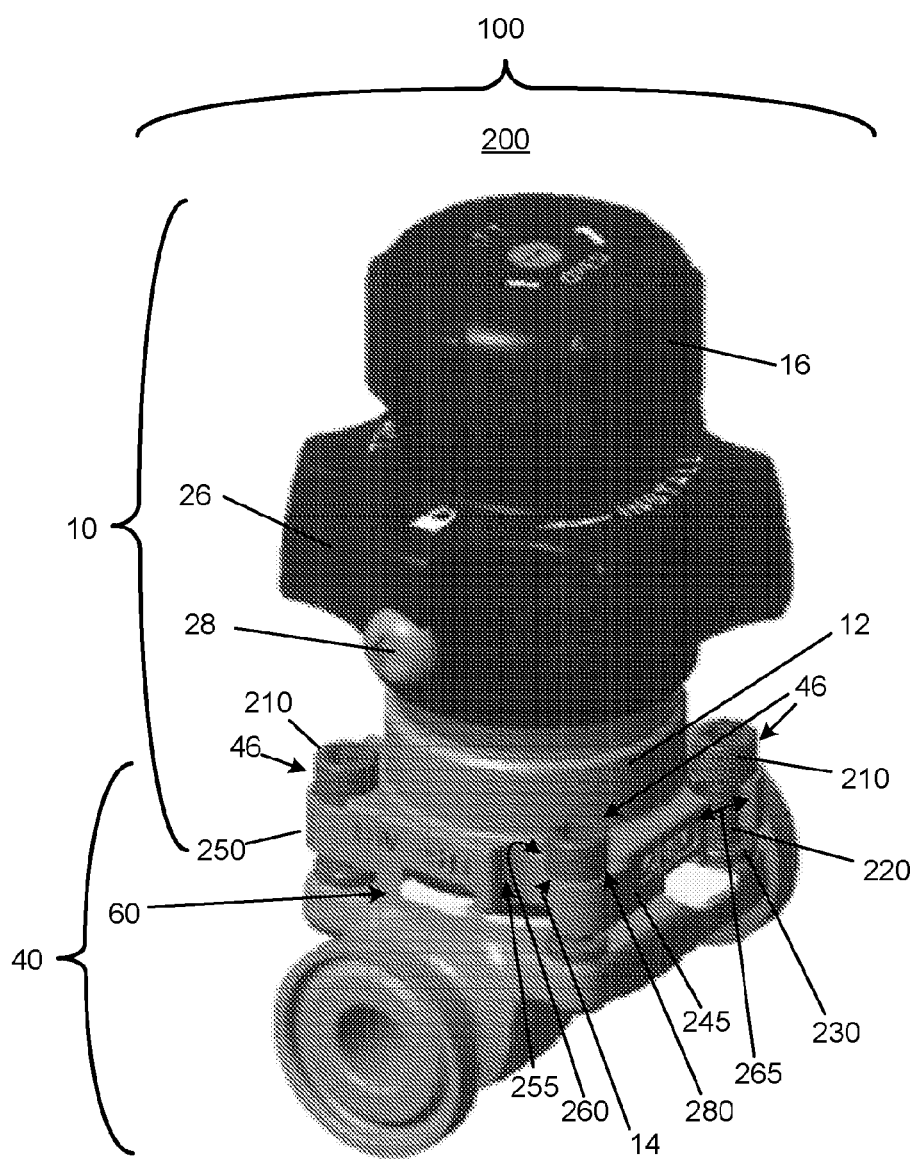
FIG. 4 is a top perspective view illustrating securing a bonnet assembly to a body assembly of a diaphragm valve.

FIG. 4 is a top prospective view illustrating securing a bonnet assembly to a body assembly of a diaphragm valve; arranged in accordance with at least some embodiments presented herein. Those components in FIG. 4 that are labeled identically to components of FIGS. 1-3 will not be described again for the purposes of brevity.

As shown in FIG. 4, bonnet assembly 10 may be attached to body assembly 40 with body studs 46 of body assembly 40 positioned within keyholes 14 defined by housing 12. Body stud necks 220 may be in slots 260 and in contact with key hooks 250. Body stud heads 210 may be within stud head wells 280 defined by key hooks 250 and housing base 245. Safety lock handwheel 26 may be rotated to apply a downward force on diaphragm assembly 60 against body assembly 40. Downward force applied to body assembly 40 by bonnet assembly and diaphragm assembly 60 may also apply and equal and opposite force upward on bonnet assembly 10 including housing base 245 and key hooks 250. Housing base 245 and key hooks 250 may apply an upward force upon body stud heads 210 within stud head wells 280.

Upward force applied to body stud heads 210 within stud head wells 280 by housing base 245 and key hooks 250 may secure body stud heads 210 in stud head wells 280 and may secure bonnet assembly 10 to body assembly 40. Body stud heads 210 may be at least partially exposed when bonnet assembly 10 is secured to body assembly 40.

Figure 5A:
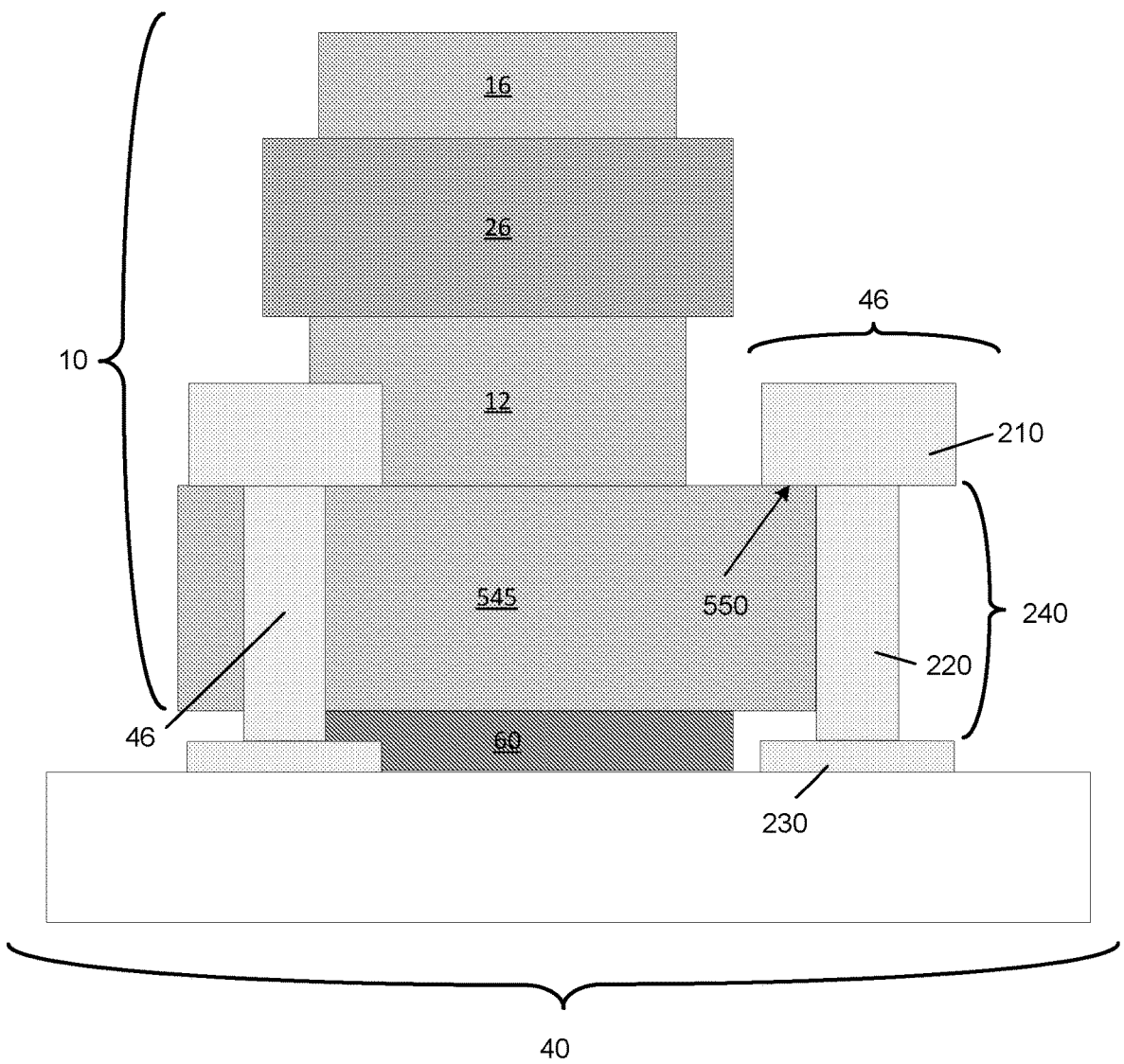
FIG. 5A is a side perspective view illustrating securing a bonnet assembly to a body assembly of a diaphragm valve.
Figure 5B:
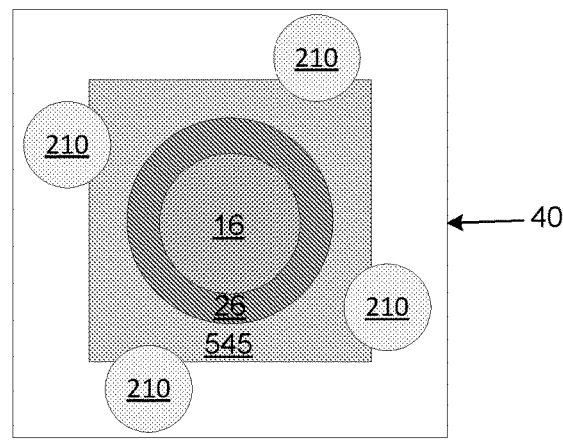
FIG. 5B is a top perspective view illustrating securing a bonnet assembly to a body assembly of a diaphragm valve.

FIG. 5A is a side prospective view illustrating securing a bonnet assembly to a body assembly of a diaphragm valve, arranged in accordance with at least some embodiments presented herein. FIG. 5B is a top prospective view illustrating securing a bonnet assembly to a body assembly of a diaphragm valve, arranged in accordance with at least some embodiments presented herein. Those components in FIGS. 5A and 5B that are labeled identically to components of FIGS. 1-4 will not be described again for the purposes of brevity.

In another embodiment, bonnet assembly 10 may include housing base 545. Housing base 545 may not include key hooks 250. Body stud heads 210 may be positioned to be in contact with a top edge 550 of the housing base 545. Diaphragm assembly 60 may be in contact with body assembly 40. Safety lock handwheel 26 may be rotated to apply a downward force on diaphragm assembly 60 against body assembly 40. Downward force applied to body assembly 40 by bonnet assembly and diaphragm assembly 60 may also apply an equal and opposite force upward on bonnet assembly 10 including housing base 545. Top edge 550 of housing base 545 may apply an upward force upon body stud heads 210. Upward force applied to body stud heads 210 by top edge 550 of housing base 245 may secure body stud heads 210 to housing base 545 and may secure bonnet assembly 10 to body assembly 40. Body stud heads 210 may be at least partially exposed when bonnet assembly 10 is secured to body assembly 40.

A device in accordance with the present disclosure may provide tool-less quick-connect mechanism to secure a bonnet assembly to a body assembly. A device in accordance with the present disclosure may provide a mechanism to secure a bonnet assembly to a body assembly with no flange bolts and no torqueing of bolts to assemble the valve. A device in accordance with the present disclosure may provide a peripheral seal that is reliably maintained without inspection and re-torque of flange bolts. A device in accordance with the present disclosure may provide a bonnet assembly that may secure to an existing body assembly with body stud heads in a square, rectangular, or offset pattern. A device in accordance with the present disclosure may provide a diaphragm connection that is reliable with a quick turn attachment. A device in accordance with the present disclosure may provide a polytetrafluoroethylene (PTFE) diaphragm valve that does not leak and operates reliably. A device in accordance with the present disclosure may eliminate possible entrapment areas between the diaphragm assembly and the body assembly. A device in accordance with the present disclosure may be easier to manufacture due to cutting of open slots rather than blind keyways.

Figure 6:
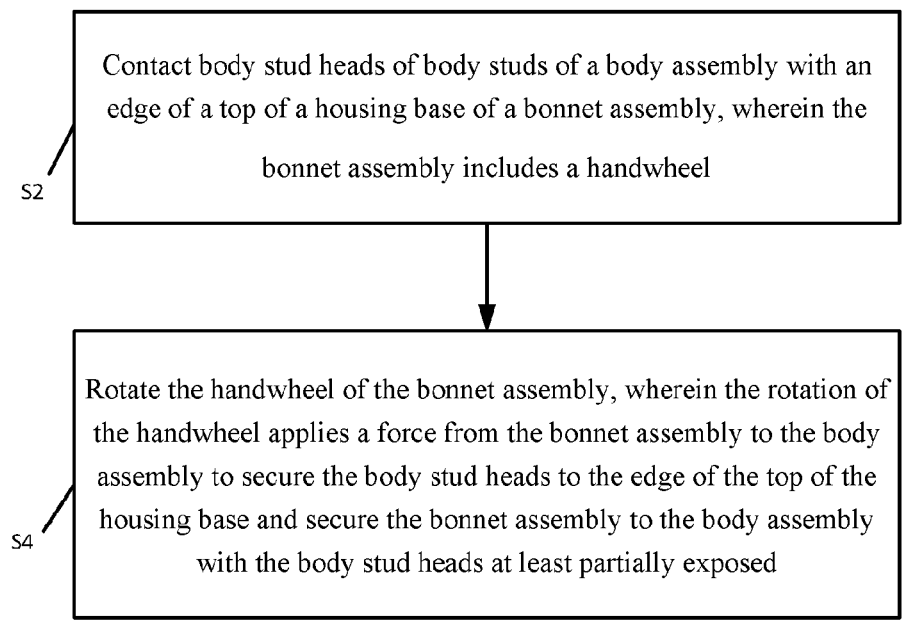
FIG. 6 illustrates a flow diagram for an example process to secure a bonnet assembly to a body assembly of a diaphragm valve, all arranged according to at least some embodiments described herein.

FIG. 6 illustrates a flow diagram for an example process to secure a bonnet assembly to a body assembly of a diaphragm valve, arranged in accordance with at least some embodiments presented herein. The process in FIG. 6 could be implemented using, for example, system 200 discussed above. An example process may include one or more operations, actions, or functions as illustrated by one or more of blocks S2, and/or S4. Although illustrated as discrete blocks, various blocks may be divided into additional blocks, combined into fewer blocks, or eliminated, depending on the desired implementation.

Processing may begin at block S2, "Contact body stud heads of body studs of a body assembly with an edge of a top of a housing base of a bonnet assembly, wherein the bonnet assembly includes a handwheel". At block S2, body stud heads of body studs of a body assembly may be contacted with an edge of a top of a housing base of a bonnet assembly. The bonnet assembly may include a handwheel.

Processing may continue from block S2 to block S4, "Rotate the handwheel of the bonnet assembly, wherein the rotation of the handwheel applies a force from the bonnet assembly to the body assembly to secure the body stud heads to the edge of the top of the housing base and secure the bonnet assembly to the body assembly with the body stud heads at least partially exposed". At block S4, the handwheel of the bonnet assembly may be rotated. The rotation of the handwheel of the bonnet assembly may apply a force from the bonnet assembly to the body assembly. The force applied by the handwheel from the bonnet assembly to the body assembly may secure the body stud heads to the top edge of the housing base. The force applied by the handwheel from the bonnet assembly to the body assembly may secure the bonnet assembly to the body assembly with the body stud heads at least partially exposed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A bonnet assembly of a diaphragm valve, the bonnet assembly comprising:
   a handwheel;
   a housing, wherein the housing includes a housing base, and the housing base is rectangular in shape with no recesses and includes a top, a bottom, and four sides;
   wherein, body stud heads of body studs of a body assembly are in contact with an outer edge of the top of the housing base and the bonnet assembly is configured to secure to the body assembly with the body stud heads and body stud necks exposed and outside of the housing base.

2. The bonnet assembly of claim 1, wherein the body stud heads have a first diameter, the body stud necks have a second diameter, and the first diameter is larger than the second diameter.

3. The bonnet assembly of claim 1, wherein a diaphragm assembly is attached to the bonnet assembly.

4. The bonnet assembly of claim 1, wherein the body studs are configured in a rectangular pattern on the body assembly with an angle of 0 degrees between sides of the rectangular pattern and sides of the body assembly.

5. A connect system for a diaphragm valve, the connect system comprising:
   a bonnet assembly, wherein the bonnet assembly includes a handwheel and a housing, wherein the housing includes a housing base, and the housing base is rectangular in shape with no recesses and includes a top, a bottom, and four sides; and
   a body assembly, wherein the body assembly includes body studs, the body studs each include a body stud head, the body stud heads are in contact with an outer edge of the top of the housing base, and the bonnet assembly is secured to the body assembly with the body stud heads and body stud necks exposed and outside of the housing base.

6. The system of claim 5, further comprising a diaphragm assembly, wherein the diaphragm assembly is attached to the bonnet assembly.

7. The system of claim 5, wherein the body stud heads have a first diameter, the body stud necks have a second diameter, and the first diameter is larger than the second diameter.

8. The system of claim 5, wherein the body studs are configured in a rectangular pattern on the body assembly with an angle of 0 degrees between sides of the rectangular pattern and sides of the body assembly.

9. A method to secure a bonnet assembly to a body assembly, the method comprising:
   contacting body stud heads of body studs of a body assembly with an outer edge of a top of a housing base of a bonnet assembly, wherein the housing base is rectangular in shape with no recesses and includes a top, a bottom, and four sides and the bonnet assembly includes a handwheel; and
   rotating the handwheel of the bonnet assembly, wherein the rotation of the handwheel applies a force from the bonnet assembly to the body assembly to secure the body stud heads to the outer edge of the top of the housing base and secure the bonnet assembly to the body assembly with the body stud heads and body stud necks exposed and outside of the housing base.

10. The method of claim 9, further comprising attaching a diaphragm assembly to the bonnet assembly prior to contacting the body stud heads with the outer edge of the top of the housing base.

11. The method of claim 9, wherein the body studs are configured in a rectangular pattern on the body assembly with an angle of 0 degrees between sides of the rectangular pattern and sides of the body assembly.

* * * * *